Figure 1:
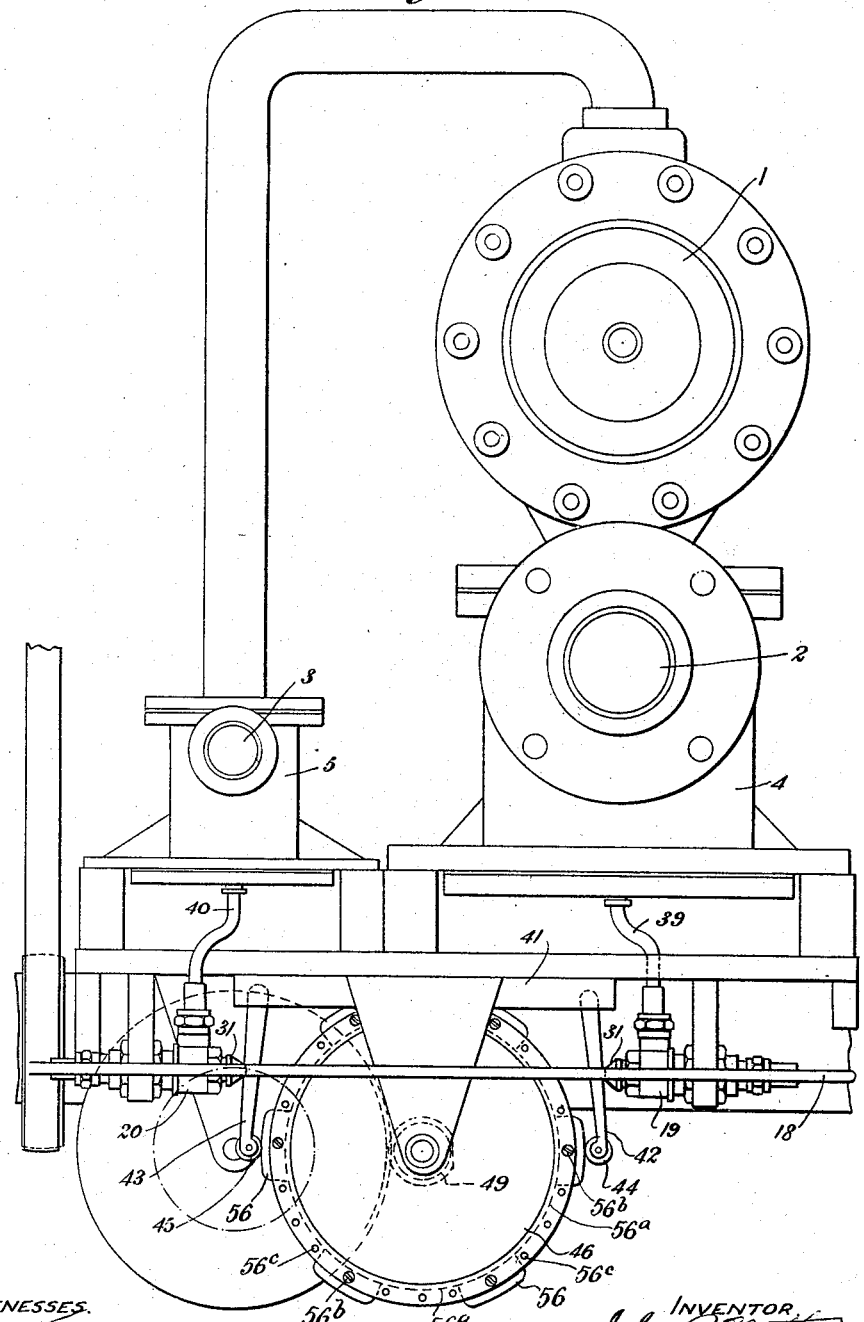

J. P. NORTHEY.
SOUND PRODUCING DEVICE FOR FOG SIGNALING, POSITION LOCATING, AND THE LIKE.
APPLICATION FILED NOV. 13, 1914.

1,202,305.

Patented Oct. 24, 1916.
5 SHEETS—SHEET 2.

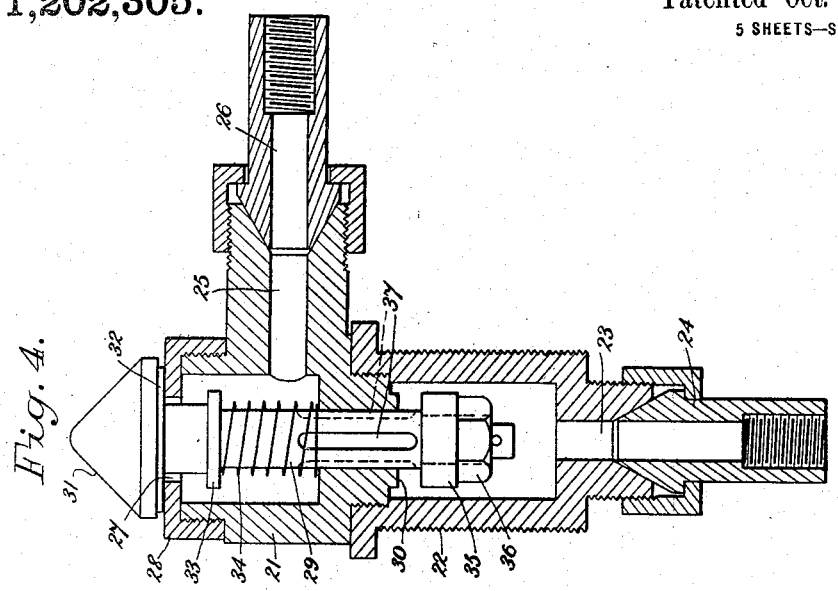
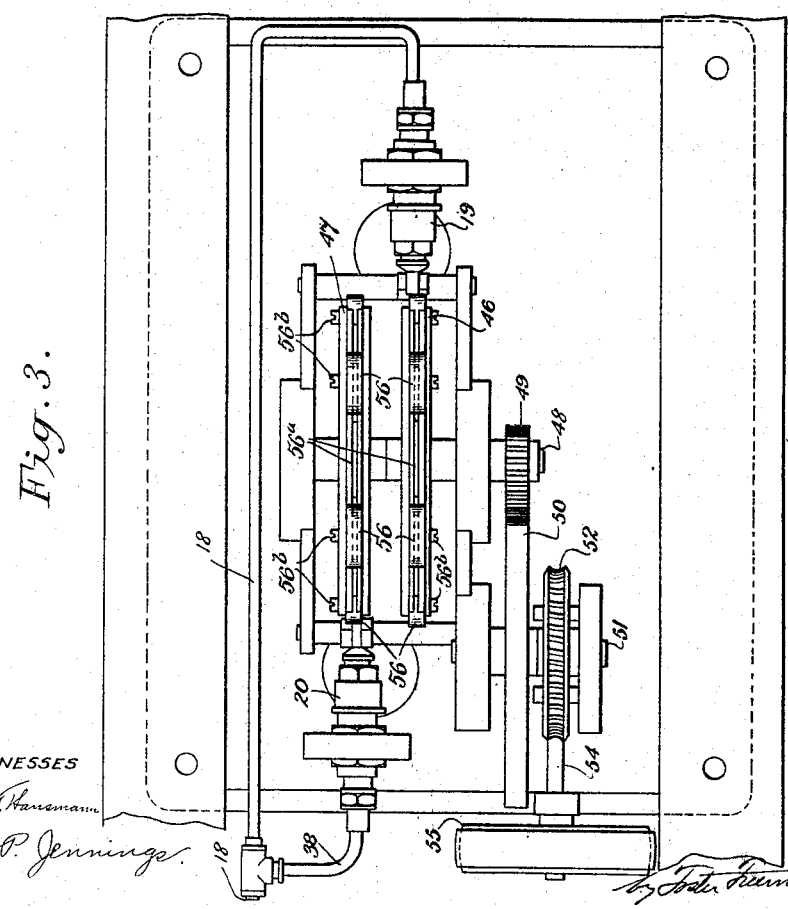

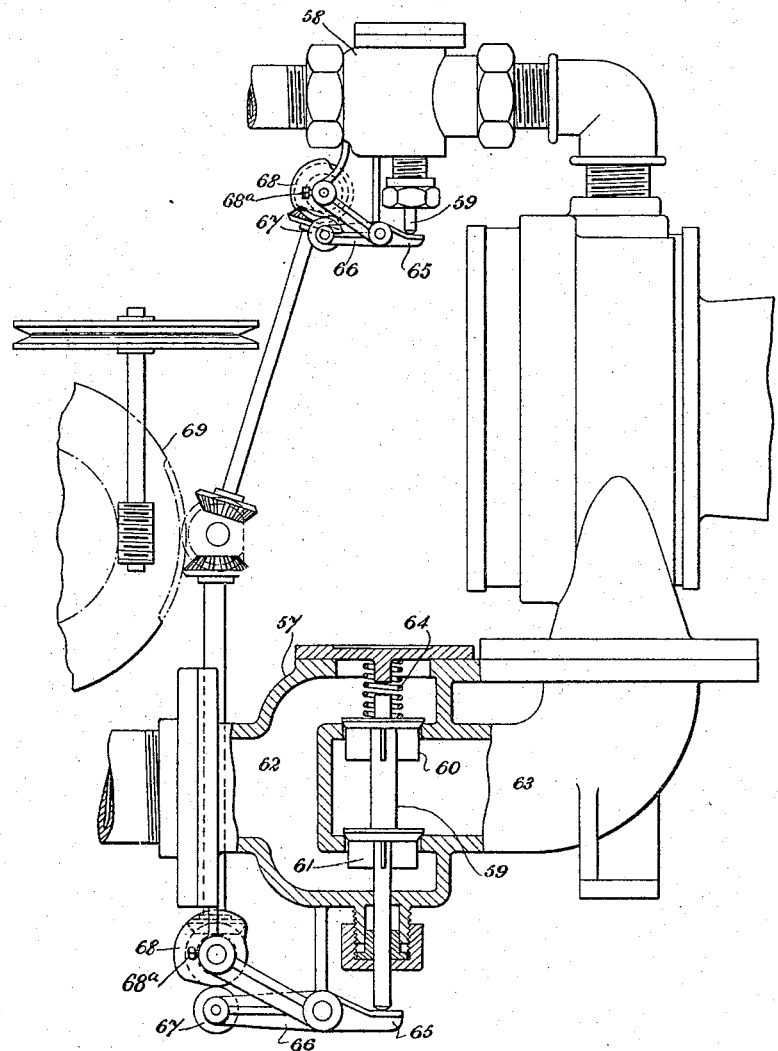

J. P. NORTHEY.
SOUND PRODUCING DEVICE FOR FOG SIGNALING, POSITION LOCATING, AND THE LIKE.
APPLICATION FILED NOV. 13, 1914.
1,202,305.
Patented Oct. 24, 1916.
5 SHEETS—SHEET 5.
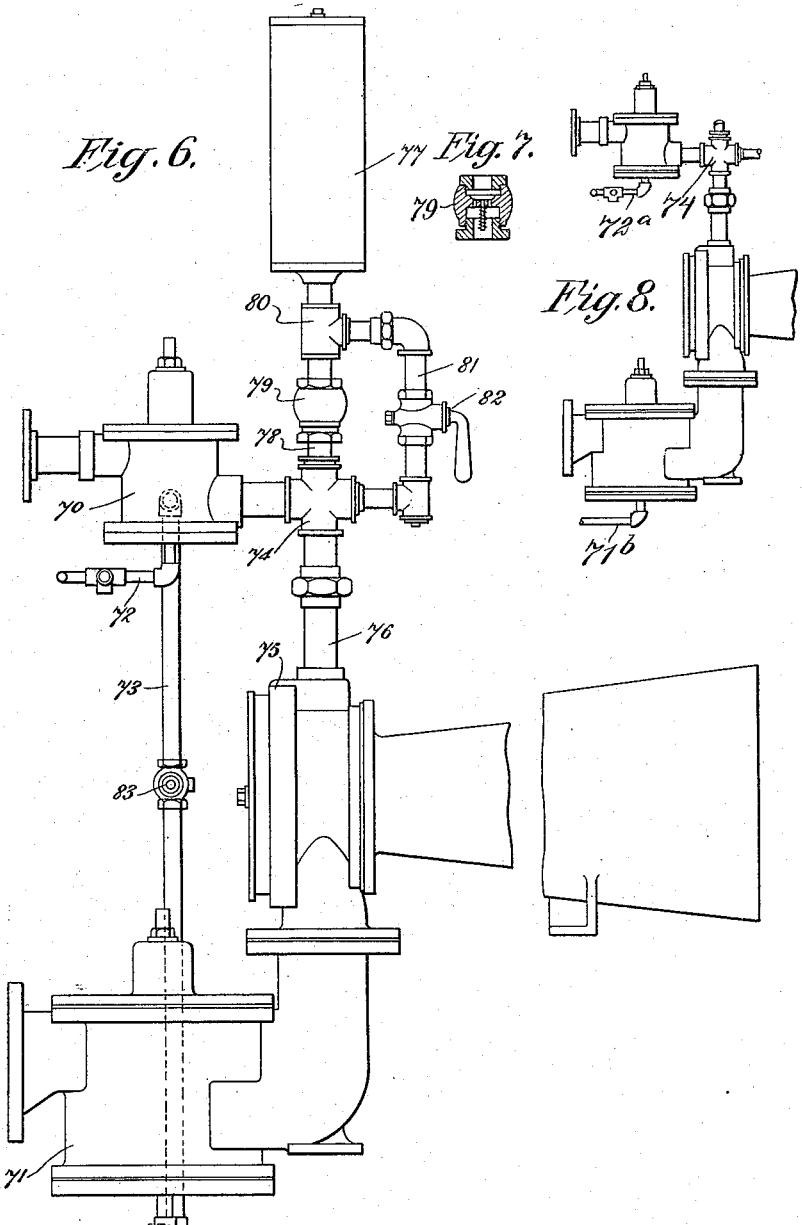

UNITED STATES PATENT OFFICE.

JOHN PELL NORTHEY, OF TORONTO, ONTARIO, CANADA, ASSIGNOR TO THE DIAPHONE SIGNAL COMPANY, OF TORONTO, CANADA, A CORPORATION OF NEW JERSEY.

SOUND-PRODUCING DEVICE FOR FOG-SIGNALING, POSITION-LOCATING, AND THE LIKE.

1,202,305. Specification of Letters Patent. Patented Oct. 24, 1916.

Application filed November 13, 1914. Serial No. 871,965.

*To all whom it may concern:*

Be it known that I, JOHN PELL NORTHEY, a subject of His Majesty the King of Great Britain and Ireland and Isle of Man, and a resident of Toronto, Canada, have invented certain new and useful Improvements in Sound-Producing Devices for Fog-Signaling, Position-Locating, and the like, of which the following is a specification.

This invention relates to sound producing devices for fog signaling, position locating, and the like, of the type in which a movable air or fluid receiving and note producing part usually working in connection with an opening or openings is operated by an engine or motor which may be supplied with motive force from the same supply of air or fluid as that used for producing the note. One form of sound producing device of this type is that in which a slotted tubular part is moved within a slotted cylinder, the two parts being supplied with steam or compressed air, such tubular part being reciprocated by a piston or enlarged head combined with it and working in a separate cylinder supplied with a small proportion of the same steam or air.

According to the present invention, the ordinary note or sound produced by instruments of the above types can be varied by the addition of a further note or sound in the nature of a cough or grunt which in certain conditions of weather when used for fog signaling or the like will be more audible, or carry farther, than the usual note, or in the same, or other circumstances will more readily distinguish the instrument giving out the sound.

This special note or sound is obtained by automatically reducing the speed of the motor or engine portion so that the vibrations of the note producing portion are lessened and its stroke also is shortened, while at the same time, the volume of fluid sent to the note producing part may if desired be reduced or regulated.

In carrying out the invention in connection with a sound producing instrument of the form more particularly described hereinbefore, the motive piston may be arranged to run both slower and shorter in its stroke, while the particular note or sound obtained may be further varied as stated by the reduction of the note producing fluid supplied to those parts.

Other features will be evident from the following description when taken in connection with the accompanying drawings, in which are shown three preferred forms of apparatus according to the invention selected by way of example only, viz:—

Figure 2:
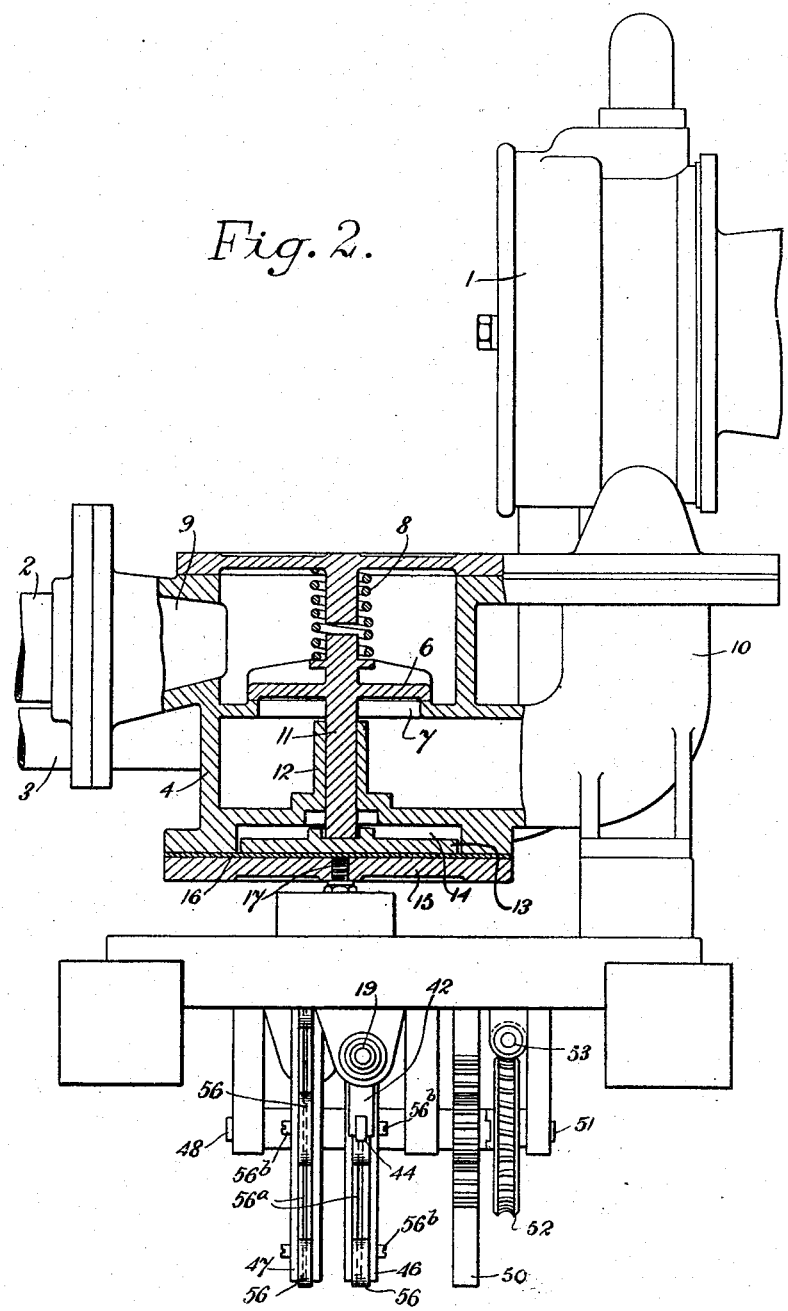

Figure 1 is a rear elevation of one form of device: Fig. 2 is a side elevation of Fig. 1 partly in section: Fig. 3 is a plan looking from below: Fig. 4 is a longitudinal section of a control valve, on an enlarged scale: Fig. 5 is a side elevation partly in section of a modified form: Fig. 6 is an elevation of part of another form of apparatus: Fig. 7 is a detail of Fig. 6, and Fig. 8 is a view showing a modification of Fig. 6 on a reduced scale.

Referring more particularly to Figs. 1 to 4, 1 represents a sound producing device of the kind described for example in the specification appertaining to United States Patent No. 879190 dated 18th February 1908. This sound producing device is supplied with air under pressure through a pipe 2 for causing the note or sound and through the pipe 3 for driving the piston of the sound producing device all in the well known manner. Interposed between the air main 2 and the grunter is a stop valve 4 and a similar but smaller valve 5 is interposed between the air pipe 3 and the grunter. As these valves are of similar construction a description of the valve 4 only will be given. The valve proper 6 is normally pressed on its seating 7 by a spring 8 and controls the flow of air from the inlet 9 to the outlet 10. It has a stem 11 which slidably fits a tubular guide or bearing 12 and bears upon a disk or plate 13 located in a chamber 14 formed at the bottom of the valve casing and closed by a cover plate 15. The disk 13 rests upon a flexible diaphragm 16 held between the cover 15 and the valve casing. On pressure being applied through an opening 17 in the cover 15 the flexible diaphragm lifts the disk 13 and with it the valve stem 11 and valve 6. In closing, the air under the diaphragm has to escape through the opening 17 so that a gradual closing results. The effective area of the diaphragm is greater than the area of the valve 6 so that the valve may be opened with a pressure equal to that obtaining in the main 2.

The valves 4 and 5 are operated by air pressure supplied through a pipe 18 and this is controlled by two control valves 19, 20, respectively, which are operated by cam mechanism to be hereinafter described. The valves 19, 20, are identical in construction and one is shown in detail in Fig. 4. These valves each comprise two body pieces 21, 22, (Fig. 4) the piece 22 screwing on the body 21 and having an inlet opening 23 with the usual union pipe connection 24. The body 21 has an outlet 25 with a pipe union 26 and an opening 27 for relieving pressure said opening being formed in a cap 28 screwed on to the body 21.

A valve stem 29 is slidable in a wall 30 of the body 21 and projects through the opening 27. At this end it is formed with an enlarged conical nose 31 against the rear face of which is a rubber washer 32. A little farther along the stem is a shoulder or collar 33 and between this collar and the wall 30 is a helical spring 34 the function of which is to move the spindle in the direction of its nose. The stem is reduced at the opposite end and carries a collar 35 held in position by a nut 36. This collar is adapted to be held tight against the wall 30 by the spring 34. The stem 29 is formed with a number of grooves or channels 37 which when the stem is in the position shown form passages for the air to pass from the inlet to the outlet side of the valve.

The valve operates as follows:—On pressing the nose 31 the stem is moved against the action of the spring 34 until the rubber washer 32 bears against the cap 28 thus closing the opening 27. At the same time the collar 35 is moved away from its seating on the wall 30 and the grooves 37 establish a free passage for the air to pass into the outlet 25 and from thence to the diaphragm of the main stop valve. On relieving the pressure on the nose 31 the stem is moved by the spring 34 to close the passage for the air past the wall 30 and uncover the opening 27 thus relieving the pressure between the diaphragm of the main stop valve and allowing it to close.

The pipe 18 communicates direct with the control valve 19 and it has a branch 38 that communicates with the control valve 20. The valve 19 is connected to the main valve 4 by a pipe 39 connected with opening 17 and the valve 20 is connected to the valve 5 by a pipe 40. Depending from the frame work 41 are two pivoted arms 42, 43, having at their free ends rollers 44, 45, respectively. These rollers are pressed against cam wheels 46, 47, by the spring pressed noses 31 of the valves 19, 20. The cam wheels 46, 47, are mounted on a shaft 48 which also carries a spur wheel 49 that engages with a mutilated gear wheel 50 mounted on a shaft 51. The shaft 51 also has mounted thereon a worm wheel 52 that gears with a worm 53 carried by a driving shaft 54 driven by the pulley 55. On each cam wheel are six cams 56 which can be adjusted in a groove 56ª around the circumference of the wheel into the desired positions by means of set screws 56ᵇ capable of being passed through holes 56ᶜ in the wheel rim. These cams are adapted to act on the rollers of the pivoted arms to operate the control valves.

It will be seen therefore that in the construction illustrated on the cam wheels being rotated the control valves will be operated a number of times to open and close the main valves controlling the supply of air to the diaphone. Further, by adjusting the relative positions of the cams on the cam wheels the moment at which the driving air is admitted to the diaphone and the moment at which it is shut off can be varied relatively to that of the sound producing air. If the driving air and sound producing air are admitted and shut off simultaneously the note produced is of constant pitch and is actually about 180 vibrations per second. If, however, and this is the manner of operating for which the apparatus is designed, and is the manner preferred, the sound producing air is not shut off at the same instant as the driving air but is subsequently shut off by a gradual closing of the main valve 4 the vibrations produced by it in the resonator will react on the piston and the speed of this will not cease abruptly with the cessation of the driving air but will gradually diminish from full speed to zero. The sound produced under these conditions comprises therefore all musical notes between 180 vibrations per second and zero, but this series is gone through so rapidly that the separate notes cannot be distinguished and the result is a note resembling a grunt.

The grunt therefore is produced by shutting off the driving air before the sound producing air is shut off. The length of time between the shutting off of the driving air and the shutting off of the sound producing air affects the grunt materially and the aforementioned cam mechanism makes it possible to arrive at this interval of time definitely and precisely.

The mutilated driving gear can be designed to give certain characteristics to the motion of the cam wheels. In the example illustrated in Figs. 1 to 3 the mutilated gear wheel 50 is driven at a constant speed of one revolution per minute. It has teeth on a small section of the circumference only and the resultant motion to the spur gear 49 and therefore the cam wheels 46, 47, is one revolution in every minute, but this revolution takes 12 seconds, that is to say, the cam wheels make a complete revolution in 12 seconds and are then motionless for 48 seconds, this being the balance of a minute. As each cam wheel carries six cams it follows that each control valve is opened six times in rapid succession during 12 seconds and closes six times in the same interval. The total result is a rapid succession of six sound blasts from the diaphone each distinct and separate and the relative arrangement of the cams giving to each blast the peculiar sound or grunt.

Fig. 5 illustrates a slightly modified arrangement in which the main valves are mechanically operated. In this case the sound producing air valve 57 and the driving air valve 58 are of the double seated balanced type and each comprises a stem 59 on which are mounted two valves proper 60, 61, that control the flow of air from the inlet 62 to the outlet 63. These valves are normally held on their seats by a spring 64. The stem 59 extends through glands or stuffing boxes at the bottom of each valve casing and each rests on one arm 65 of double arm levers, the other arms 66 of which carry rollers 67 that run on cams 68. These cams are driven by a mutilated gear 69 through the medium of bevel wheels and shafts. It will be seen that by adjusting the cams 68 by set screws 68$^a$ the moment of opening and closing the valve 57 can be varied relatively to the moment of opening and closing the valve 58 so that the same result can be attained as described with reference to the construction shown in Figs. 1–4.

Another modified arrangement is illustrated in Fig. 6 where 70 represents the driving air valve and 71 the sound producing air valve. These valves are similar to those described with reference to Figs. 1–4, the pipe 72 corresponding to pipe 40 of Fig. 1. The valve 70 is opened by air pressure admitted through a pipe 72, said pressure being controlled by cam mechanism similar to that described with reference to Figs. 1–4. The underside of the valve 70 is connected by means of a pipe 73 to the diaphragm chamber of the valve 71 so that on the valve 70 being opened pressure is applied to the valve 71 and immediately thereafter this latter valve is opened. The valve 70 is connected to a four-way branch piece 74 which latter communicates with the sound producing device 75 by the pipe 76. The branch 74 also communicates with a reservoir 77 by way of the pipe 78 in which a non-return valve 79 is located. From a branch 80 on the reservoir side of the valve 79 a by-pass 81 is provided which communicates with the diaphone side of the valve 79. This by-pass has a cock 82 therein which controls the passage of air to the sound producing device from the reservoir.

It will be seen that air supply is not available to the valve 71 until the valve 70 is opened. There is therefore a small fraction of time between the opening of the valve 70 and the opening of the valve 71. This interval is not noticeable in practice and is not essential, it can, however, be controlled by the adjustment of a small cock 83 in the pipe 73. When the valve 70 opens, air supply is also admitted to the driving head of the piston directly and the reservoir is filled quickly through the check valve 79. When the valve 70 is closed the air in the reservoir is allowed to filter quickly or slowly by means of the cock 82 to the driving head of the piston and also through the pipe 73 to the large valve 71. There is of course no return of the air possible through the check valve 79 see Fig. 7. The filtering of the air to the piston head and to the large valve allows the speed of the piston to gradually diminish and also closes the large speaking valve slowly so that there is a gradual lowering of the note of the sound producing device and at the same time a gradual decrease of the air pressure and consequently of the volume, which gives rise to a prolonged grunt instead of a short sharp one. This prolonging of the grunt is completely controlled by the cock 83 and if this is fully opened the grunt will be almost as short if not quite as short as by the ordinary method.

The illustration shows the simplest arrangement of the apparatus in which the main control is from the timing device by a single pipe to the small valve 70. Both valves 70, 71, may be operated separately from the timing device, and at the same time retain the features of the reservoir. This arrangement is accomplished in two ways, first by retaining pipe 73, and making an additional individual connection shown by dotted lines as a pipe 71$^a$ corresponding to pipe 39 of Fig. 1 between the timing device control valve of Fig. 1 and the large valve 71 and secondly as shown in Fig. 8 by doing away altogether with pipe 73 and having only the individual connection 71$^b$ corresponding to pipe 39 of Fig. 1 between the timing device control valve of Fig. 1 and the large valve 71, the valve 70 being controlled direct as before by pipe 72$^a$ corresponding with pipe 40 of the timing device control valve of Fig. 1. In the second manner the reservoir is only used to control the speed of the piston and the large speaking valve being controlled separately can be sharply cut off at any point in the fall of the note given by the lowering speed of the piston.

What I claim is:—

1. The combination in a sound producing device of the class described, of a fluid supply for note production, a fluid supply for operating a note producing engine, separate automatic controlling valves for the note fluid and the engine fluid, and means for controlling such valves, whereby the control of the engine fluid may be varied relatively to the control of the note fluid to vary the note produced by the latter.

2. The combination in a sound producing device of the class described, of a fluid supply for note production, a fluid supply for operating a note producing engine, automatic means for shutting off the engine fluid, and like means for gradually shutting off the note fluid after the engine fluid is shut off, in order to vary the note produced.

3. The combination in a sound producing device of the class described, of a fluid supply for note production, a fluid supply for operating a note producing engine, main valves for the engine fluid and note fluid respectively, and adjustable intermittently operated means for controlling said main valves, to permit of the valves of the engine fluid and the valves of the note fluid being independently adjusted and operated to vary the supply of the said fluids to their respective parts and consequently the note produced.

4. The combination in a sound producing device of the class described, of a fluid supply for note production, a fluid supply for operating a note producing engine, pneumatically operated main valves for the engine and note fluids, mechanically operated valves for controlling said main valves, and adjustable cam means for actuating said mechanically controlled valves, to vary the times of opening and closing of the pneumatically operated valves.

5. The combination in a sound producing device of the class described, of a fluid supply for note production, a fluid supply for operating a note producing engine, pneumatically operated main valves for the engine and note fluids, mechanically operated valves for controlling said main valves, the main valves comprising each a valve stem, a diaphragm chamber, a diaphragm in said chamber, and a disk resting on said diaphragm, the valve stem extending into said diaphragm chamber and resting on the disk, and adjustable and independent means for operating the mechanically operated valves to vary the times of opening and closing of the pneumatically operated valves.

6. The combination in a sound producing device of the class described, of a fluid supply for note production, a fluid supply for operating a note producing engine, pneumatically operated main valves for the engine and note fluids, mechanically operated valves for controlling said main valves, adjustable cams for the operation of the mechanically controlled valves, and intermittent driving gear for rotating said cams whereby the times of opening and closing of the pneumatically operated valves can be varied.

In testimony whereof I have hereunto set my hand in the presence of two subscribing witnesses.

JOHN PELL NORTHEY.

Witnesses:
 THOMAS PAGE WADSWORTH,
 JANET MACKENZIE.

Copies of this patent may be obtained for five cents each, by addressing the "Commissioner of Patents. Washington, D. C."